(12) United States Patent
Chen (10) Patent No.: US 12,338,066 B2
(45) Date of Patent: Jun. 24, 2025

(54) FIXING STRUCTURE FOR LID ASSEMBLY AND DISASSEMBLY

(71) Applicant: INOX BIN PRODUCTS LIMITED, Jiangmen (CN)

(72) Inventor: Yizhi Chen, Jiangmen (CN)

(73) Assignee: INOX BIN PRODUCTS LIMITED, Jiangmen (CN)

( * ) Notice: Subject to any disclaimer, the term of this patent is extended or adjusted under 35 U.S.C. 154(b) by 42 days.

(21) Appl. No.: 18/335,684

(22) Filed: Jun. 15, 2023

(65) Prior Publication Data
US 2023/0322482 A1    Oct. 12, 2023

(30) Foreign Application Priority Data

Dec. 26, 2022   (CN) .......................... 202223484667.2

(51) Int. Cl.
*B65F 1/16* (2006.01)
*B65F 1/02* (2006.01)

(52) U.S. Cl.
CPC .............. *B65F 1/1646* (2013.01); *B65F 1/02* (2013.01); *B65F 1/163* (2013.01); *B65F 2220/124* (2013.01)

(58) Field of Classification Search
CPC .......... B65F 1/1646; B65F 1/02; B65F 1/163; B65F 2220/124
See application file for complete search history.

(56) References Cited

U.S. PATENT DOCUMENTS

| | | | | |
|---|---|---|---|---|
| 3,015,405 A | * | 1/1962 | Sterling | B65F 1/1646 D34/8 |
| 3,390,804 A | * | 7/1968 | Morgan | B65F 1/1615 D34/8 |
| 4,592,483 A | * | 6/1986 | Scouten | B65D 39/00 220/744 |
| 2007/0051738 A1 | * | 3/2007 | Slayton | B65D 47/06 220/744 |
| 2015/0239622 A1 | * | 8/2015 | Jian | B65D 19/06 220/813 |
| 2023/0278782 A1 | * | 9/2023 | Jian | B65D 90/587 220/379 |

FOREIGN PATENT DOCUMENTS

| | | |
|---|---|---|
| CN | 112224708 A | 1/2021 |
| CN | 214268882 U | 9/2021 |
| CN | 217125813 U | 8/2022 |

\* cited by examiner

*Primary Examiner* — James N Smalley (57) ABSTRACT

A fixing structure for lid assembly and disassembly of a trash can, including a hanging structure. The trash can includes a trash can body, a lid and a connecting part. The hanging structure includes a groove and a hanging part. The groove is provided on an outer side wall of the trash can body. The hanging part is provided on the lid. The hanging part and the groove are configured to be engaged with or disengaged from each other to enable the attachment of the lid to the trash can body or the detachment of the lid from the trash can body. When the connecting part is disengaged from the lid, the lid is hung on a side of the trash can body.

12 Claims, 12 Drawing Sheets

FIXING STRUCTURE FOR LID ASSEMBLY AND DISASSEMBLY

CROSS-REFERENCE TO RELATED APPLICATIONS

This application claims the benefit of priority from Chinese Patent Application No. 202223484667.2, filed on Dec. 26, 2022. The content of the aforementioned application, including any intervening amendments thereto, is incorporated herein by reference in its entirety.

TECHNICAL FIELD

This application relates to trash cans, and more particularly to a fixing structure for lid assembly and disassembly.

BACKGROUND

For a pedal flipping trash can, its lid needs to be rotatably connected to the trash can body, and it also has many components (such as pedal and support rod). If the trash cans are transported in a well-assembled form, the excessive size will greatly increase the transportation cost. During the transportation, the trash containers are stacked, and the lids and other components are places inside the container at the top. Accordingly, the semi-finished trash can assembly needs to be subject to secondary assembly (by sales staff or user), and thus an easy-to-operate assembly is required for the pedal flipping trash can.

In the prior art, for the convenient assembly of the flipping structure, a cylindrical block and a corresponding hole are often arranged to enable the rotating fit between the container and lid. In order to ensure the structural strength, the block and hole are respectively arranged in non-elastic areas of the lid and the container, and in this case, a considerable force is required to press the block into the hole, resulting in poor user experience. In addition, high requirements are raised for the size precision of the block. Excessive size will lead to unsuccessful assembly; and the insufficient size will render the structure loose and unstable. Moreover, for easy installation, a thinner sheet-shaped structure or C-shaped ring which can subject to elastic deformation is additionally arranged, on which the block or hole is arranged. Optionally, the C-shaped ring is used as a clamping fastener, such that the sheet-shaped structure or the C-shaped ring can be elastically deformed under the action of a small force to form the rotational snap fit. Unfortunately, considering that the block and the hole are the main stress structures during the flipping process, the strength of the sheet-shaped structure or the C-shaped ring is insufficient, and frequent flipping will cause deformation or fracture, making the lid unstable and prone to falling off from the container or fail to flip normally.

Moreover, as fed back by the overseas dealers, in the large stores (e.g., Wal-Mart, Costco, etc.), the semi-finished products are often directly stacked for sale instead of being assembled due to high labor costs. Considering that the multiple lids are together placed in the top trash contain, the store staff or customers may forget to pick up the lid or may take all lids away, resulting in unnecessary loss or additional after-sales operations.

Hence, it is necessary to design a trash can assembly that can be sold as a "trash container-lid" lid without hindering the stacking of multiple trash containers and has an easy assembly operation.

Chinese patent application No. 202022841545.9 discloses a detachable lid assembly with mortise-tenon structure for trash cans, including a trash container. The trash container is provided with a lid and a handle. The connection between the trash container, lid and handle is enabled through a lid fixing hole, a handle fixing hole, a mortise-tenon expansion pin and a connecting wire assembly. The mortise-tenon expansion bolt includes a knob, a pin post, a pin protrusion and a wire-locking hole. The pin post has a hollow expansion structure. Inside the lid fixing hole is provided with a groove for accommodating a lid pin protrusion. The handle fixing hole is provided with a groove for accommodating a handle pin protrusion and a groove configured for the rotation of a handle pin. The connecting wire assembly includes a lid wire-locking hole, a pin wire-locking hole, a connecting wire and a connecting wire wire-locking hole.

The trash can provided in the above-mentioned patent application has easy and simple lid installation and detachment, and overcomes the problems that the lid is not easy to remove, and the latch is prone to damage. Whereas, the mortise-tenon structure will make the lid non-rotatable, and thus another opening is required receive the trash. Therefore, such design is suitable for public garbage bins which require a larger volume, but not suitable for household trash cans. Besides, such trash can assembly cannot be sold in a "trash container-lid" kit, and such design will hinder the stacking of multiple trash containers.

SUMMARY

An object of the present disclosure is to provide a fixing structure for lid assembly and disassembly to overcome the aforementioned deficiencies in the prior art.

Technical solutions of the present disclosure are described as follows.

This application provides a fixing structure for lid assembly and disassembly of a trash can, the trash can comprising a trash can body, a lid and a connecting part; the trash can body and the lid being arranged separately; the connecting part being arranged at an opening of the trash can body; the connecting part being in snap-fit connection with the lid; the connecting part being able to flip relative to the trash can body, so as to drive the lid in snap-fit connection with the connecting part to flip; and the fixing structure comprising:
 a hanging structure;
  wherein the hanging structure comprises a hanging groove and a hanging part; the hanging groove is provided on an outer side wall of the trash can body; the hanging part is provided on the lid; the hanging part is configured to be engaged with the hanging groove to enable attachment of the lid to the trash can body, and is configured to be disengaged from the hanging groove to enable detachment of the lid from the trash can body; and when the lid is disengaged from the connecting part, the hanging part is engaged with the hanging groove, such that the lid is hung on a side of the trash can body.

In an embodiment, the trash can comprises a mounting base; the mounting base is protrusively arranged on the outer side wall of the trash can body at the opening; the connecting part is arranged on the mounting base; the hanging groove is provided on an outer side wall of the mounting base; and when the lid is attached to the mounting base, an avoidance gap is provided between the lid and the trash can body, and a width of the avoidance gap is larger than a wall thickness of the trash can body.

In an embodiment, the hanging structure further comprises a clamping portion; the clamping portion is arranged inside the hanging groove; the clamping portion is configured as a strip-shaped structure extending along a depth direction of the hanging groove; the clamping portion comprises a top end; the top end is located at a middle of the hanging groove in a length direction of the hanging groove; the hanging part comprises a first side surface, a second side surface, and a third side surface; the first side surface is perpendicular to the lid; the second side surface is perpendicular to the first side surface, and is parallel to the lid; the third side surface is perpendicular to the lid, the first side surface and the second side surface; the first side surface, the second side surface and the third side surface together form a clamping cavity; the clamping cavity is configured to accommodate the clamping portion; the third side surface is configured to abut against the top end of the clamping portion to enable the clamping portion to be clamped in the clamping cavity.

In an embodiment, the clamping portion further comprises a first side wall and a second side wall; the first side wall is arranged towards a bottom of the hanging groove; any two of the top end, the first side wall and the second side wall are perpendicular to each other; the first side wall is located at a middle of the hanging groove in the depth direction of the hanging groove; the second side wall is located at a middle of the hanging groove in a width direction of the hanging groove; the hanging structure further comprises a tab; the tab is protrusively arranged on the first side wall; a side of the second side surface away from the first side surface is provided with a clamping groove; and the tab is configured to be clamped in the clamping groove to fix the hanging part relative to the hanging groove.

In an embodiment, the bottom of the hanging groove is provided with a notch, and the tab is partially located in the notch; and one end of the tab protrudes from the first side wall of the clamping portion, and the other end of the tab is provided on a bottom wall of the mounting base to form a reinforcement structure.

In an embodiment, the trash can further comprises at least one rotating connection shaft; a top end of the mounting base is provided with a shaft-hole base; the shaft-hole base is provided with a first shaft hole; the connecting part is provided with a second shaft hole; and the at least one rotating connection shaft is configured to be inserted into the first shaft hole and the second shaft hole to enable hinged connection between the connecting part and the trash can body.

In an embodiment, the trash can further comprises a decorative ring; the decorative ring is provided at the opening of the trash can body; the decorative ring is configured to allow trash to enter the trash can body; and the lid is configured to cover an inner ring of the decorative ring.

In an embodiment, the decorative ring is coaxially connected to the first shaft-hole base; and the decorative ring is able to rotate relative to the first shaft-hole base.

In an embodiment, the lid is provided with an insertion groove; the connecting part comprises an inserting block and a rotatable connection shaft cylinder; the inserting block is arranged on a top end of the rotatable connection shaft cylinder; the rotatable connection shaft cylinder is in coaxial connection with the trash can body to enable the connecting part to flip relative to the trash can body; the inserting block is configured to be inserted into the insertion groove to achieve snap-fit connection between the connecting part and the lid.

In an embodiment, the connecting part comprises two tabs; the two tabs are provided on the top end of the rotatable connection shaft cylinder; one of the two tabs is provided at one side of the inserting block, and the other of the two tabs is provided at the other side of the inserting block; a clearance is provided between each of the two tabs and the inserting block; the two tabs are elastic; two side walls of the insertion groove are each provided with a gap; and the two tabs are configured to be respectively clamped in gaps of the side walls of the insertion groove to fix the inserting block in the insertion groove.

In an embodiment, the connecting part further comprises a connection seat; one end of the connection seat is connected to the rotatable connection shaft cylinder, and the other end of the connection seat is connected to the inserting block; the trash can further comprises a pedal and a support rod; the pedal is provided at a bottom end of the outer side wall of the trash can body; one end of the support end is connected to the pedal, and the other end of the pedal is connected to the connection seat, so as to drive the lid to flip.

In some embodiments, the outer side wall of the trash can body is provided with an accommodating groove; the pedal is arranged in the accommodating groove; and the pedal is capable of flipping relative to the trash can body to enable the pedal to be stored in the accommodating groove.

Compared to the prior art, the present disclosure has the following beneficial effects.

(1) In this application, a split-type (detachable) design is adopted for the trash can body and the lid, such that multiple trash can bodies can be stacked during the transportation to reduce the space occupation, facilitating the control of the transportation cost.

(2) The hanging structure that does not affect the stacking of multiple trash can bodies is provided between the trash can body and the lid, such that there is no need for the staff to assemble the lid with the trash can body in advance, and the trash can product can be sold as a "trash can body-lid" kit, avoiding problems that the lid is missed, or more lids are taken by mistake.

(3) In addition, the rotary connection structure of the trash can body and the lid is the main stress structure, and thus has high requirements for both the connection firmness and structural strength. However, the stable connection and higher structural strength often lead to higher assembly difficulty. Therefore, in the implementation of this application, a rotatable connecting part is pre-installed at the opening before delivery, and the users just need to install a simple snap-fit structure. Since the rotatable connecting part has been pre-installed by the professional manufacturer before delivery, it can be designed into a structure with higher structural strength and larger installation difficulty to reach the desired service life. The snap-fit structure, which is not the main stress structure, can be designed with lower strength but simple assembly, improving user experience and reducing the return rate.

(4) Compared to the trash can products without the decorative ring, the trash can with the decorative ring pre-installed at the body is more conspicuous and aesthetic, and can attract consumers' attention more easily, leading to an increase in sales.

In the drawings, 1, lid; 101, insertion groove; 101a, gap; 101b, top surface; 102, hanging part; 102a, clamping groove; 102b, clamping cavity; 102c, first side surface; 102d, second side surface; 102e, third side surface; 2, mounting base; 201, shaft-hole base; 201a, first shaft hole; 201b, protrusion; 202, hanging groove; 202a, clamping portion; 202b, top end; 202c, first side wall; 202d, second side wall; 202e, opening; 202f, bottom; 203, first tab; 204, notch; 3, decorative ring; 4, trash can body; 401, accommodating groove; 5, pedal; 6, connecting part; 601, connection seat; 602, inserting block; 603, second tab; 603a, hook portion; 604, butting portion; 605, rotatable connection shaft cylinder; 605a, second shaft hole; 606, clearance; 7, rotating connection shaft; 8, support rod; and 9, avoidance gap.

DETAILED DESCRIPTION OF EMBODIMENTS

The technical solutions in the embodiments of the present disclosure will be clearly and completely described below with reference to the accompanying drawings. Obviously, described below are only some embodiments of the present disclosure, which are not intended to limit the disclosure. Based on the described embodiments, any embodiment obtained by one of ordinary skill in the art without paying creative effort shall fall within the scope of the present disclosure.

As used herein, terms "center", "vertical", "horizontal", "length", "width", "thickness", "top", "bottom", "front", "back", "left", "right", "vertical", "horizontal", "top", "bottom", "inside", "outside", "clockwise", "anticlockwise", "axial", "radial" and "circumferential" refer to orientational or positional relationship shown in the drawings, which are merely for better description of the present disclosure instead of indicating or implying that the device or element referred to must have a specific orientation, or be constructed and operated in a specific orientation. Therefore, these terms should not be construed as a limitation to the present disclosure.

Figure 1:
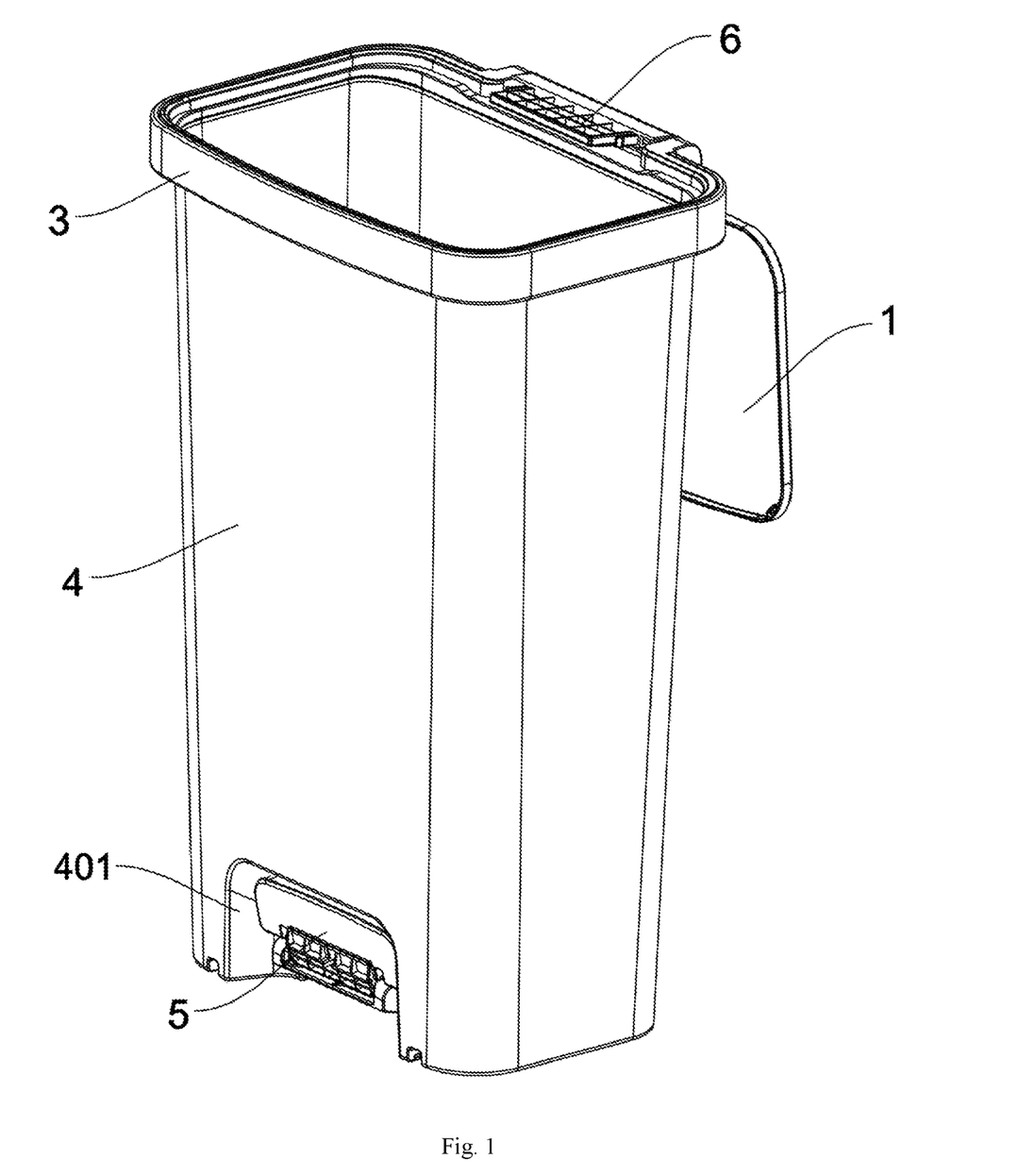
FIG. 1 is a first schematic diagram of a trash can according to an embodiment of the present disclosure with a lid not attached to a trash can body.
Figure 2:
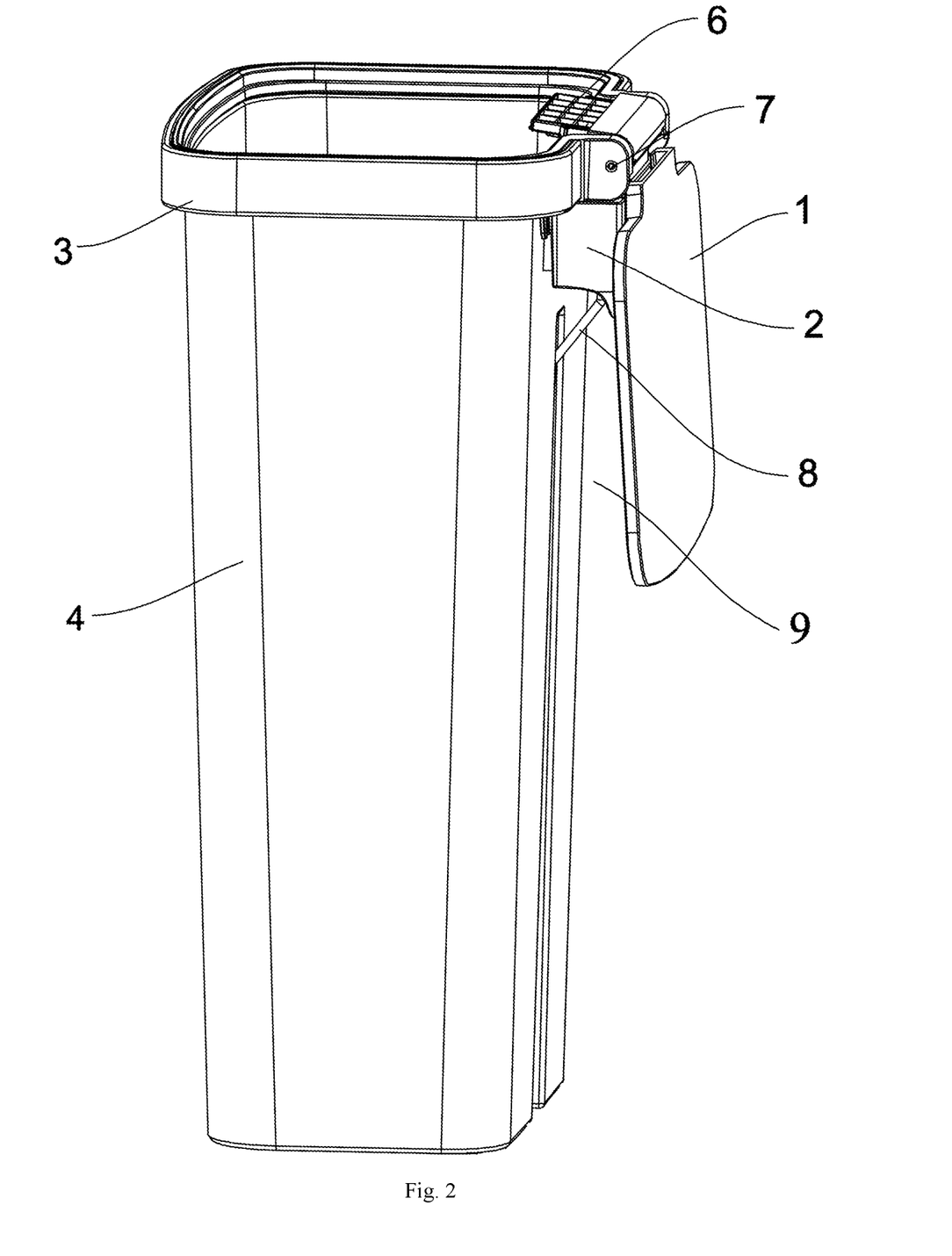
FIG. 2 is a second schematic diagram of the trash can according to an embodiment of the present disclosure with the lid not attached to the trash can body.
Figure 3:
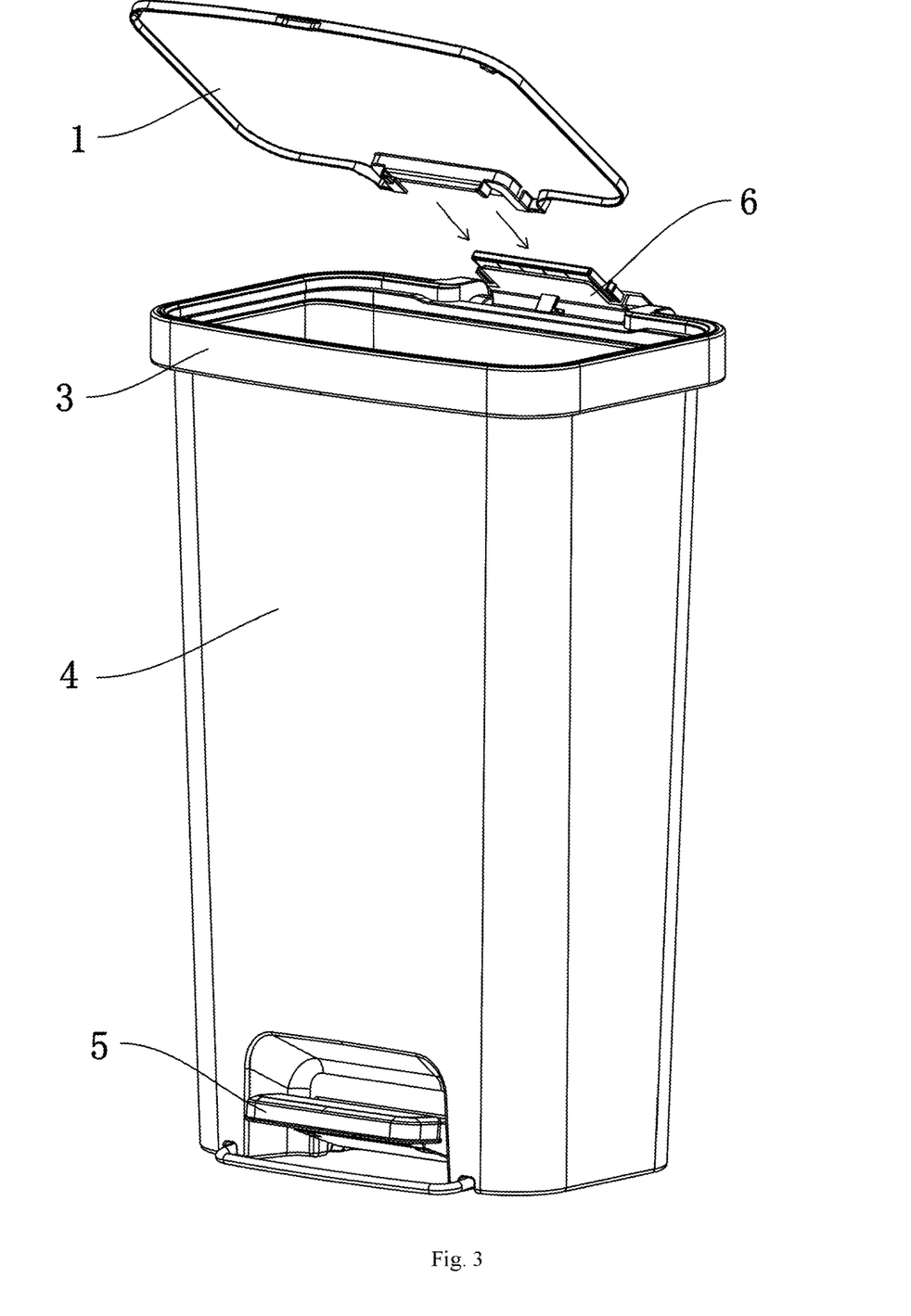
FIG. 3 schematically shows an assembly of the lid to the trash can body according to an embodiment of the present disclosure.
Figure 4:
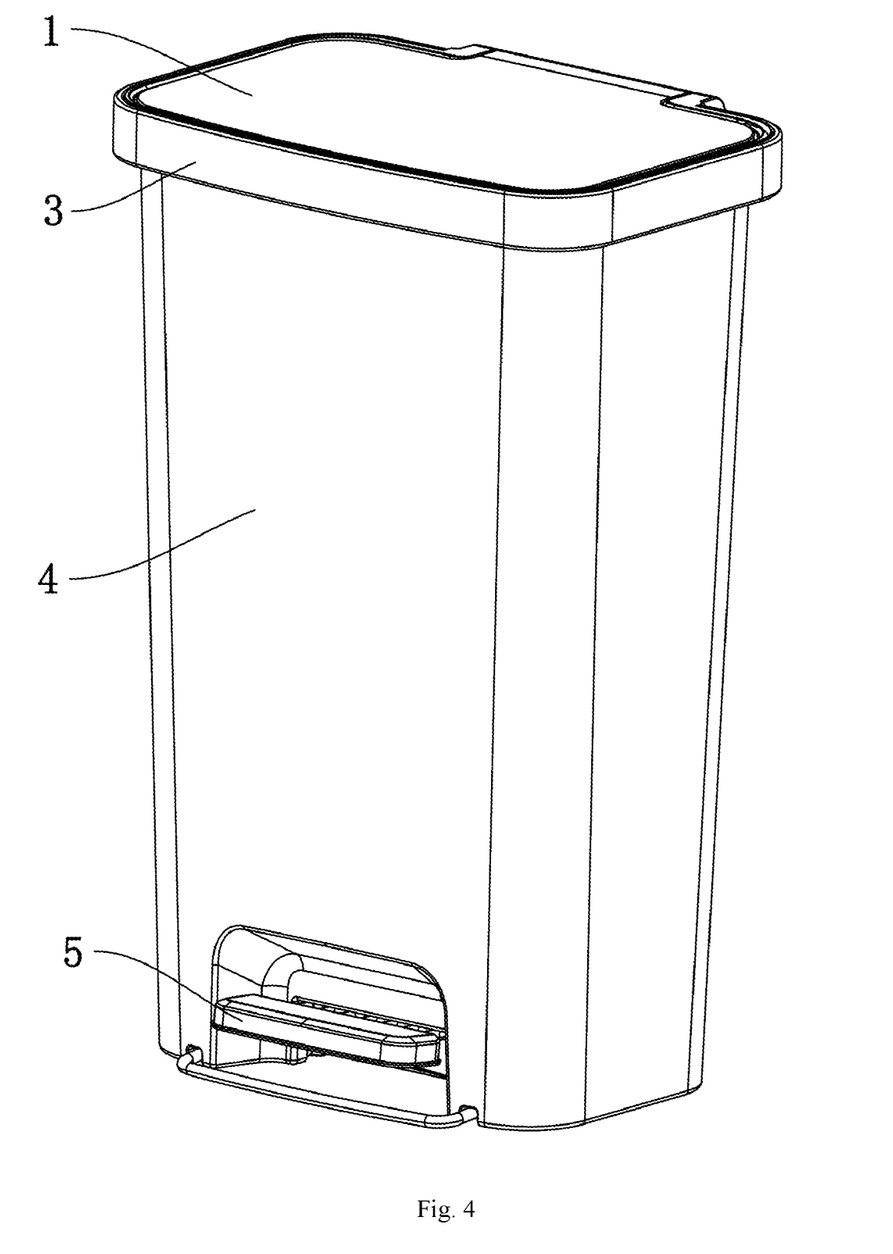
FIG. 4 is a first schematic diagram of the trash can assembled with the lid according to an embodiment of the present disclosure.
Figure 5:
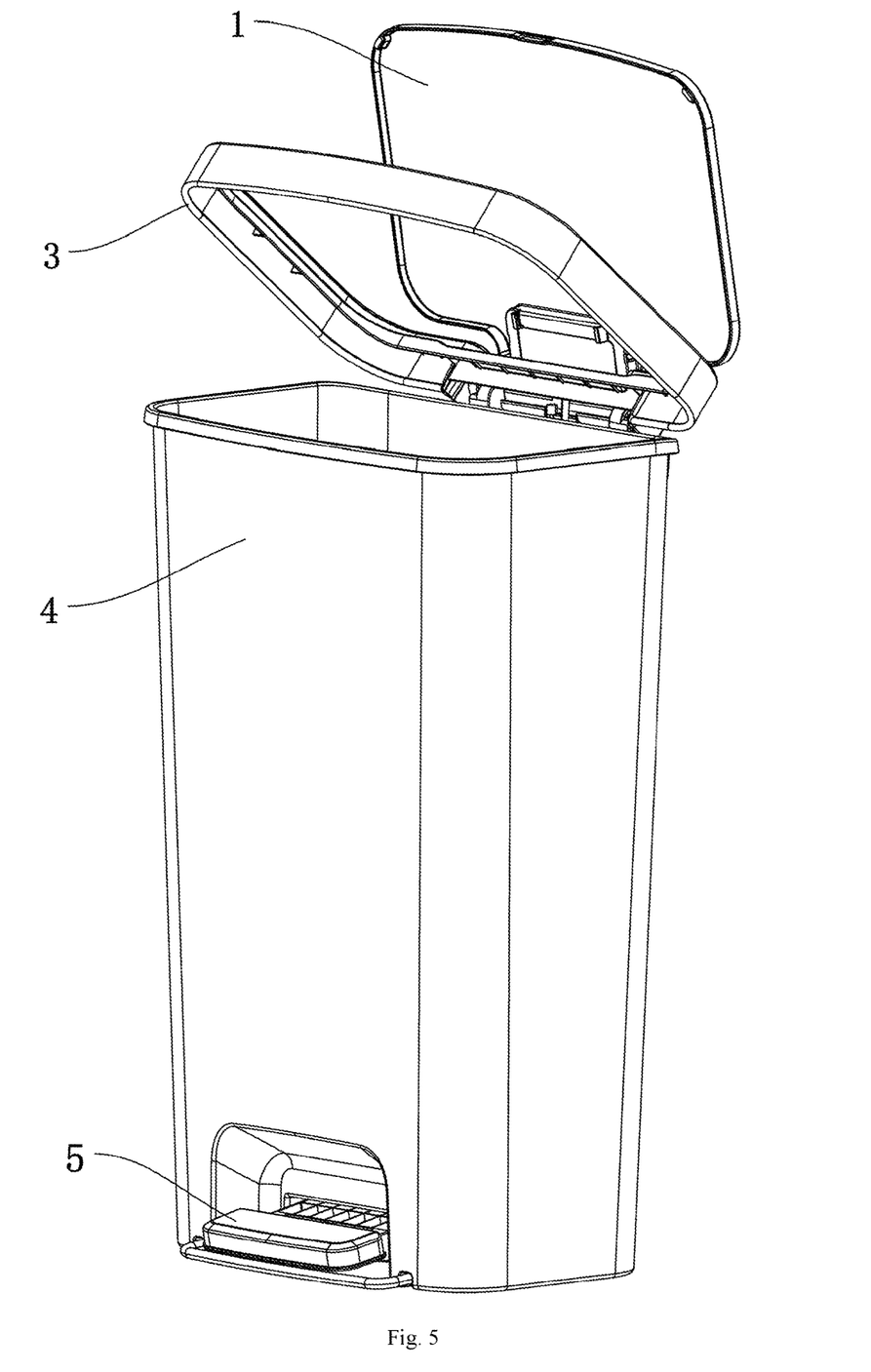
FIG. 5 is a second schematic diagram of the trash can assembled with the lid according to an embodiment of the present disclosure.
Figure 6:
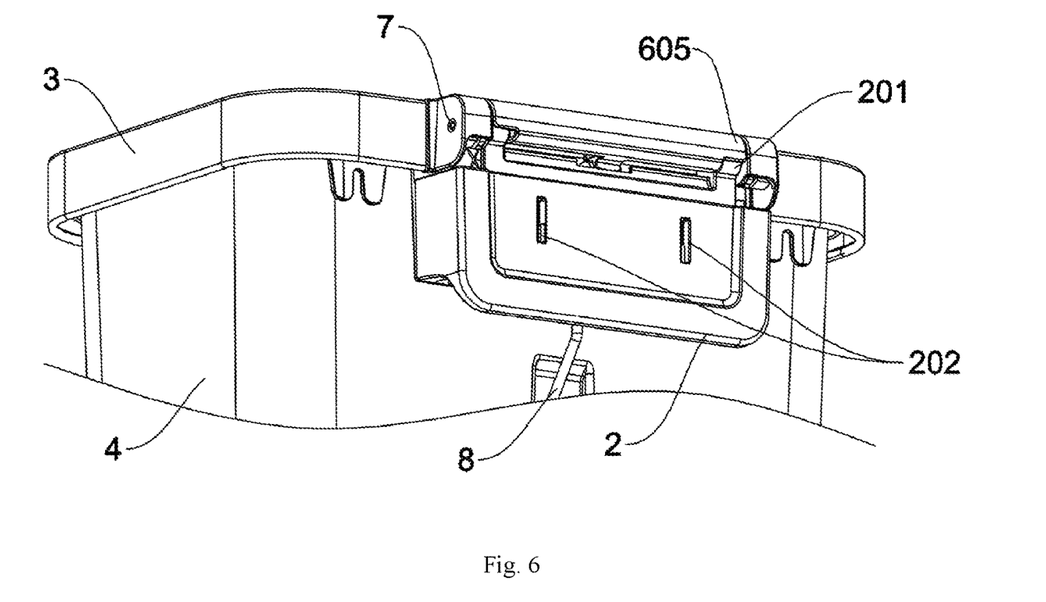
FIG. 6 is a third schematic diagram of the trash can assembled with the lid according to an embodiment of the present disclosure.
Figure 7:
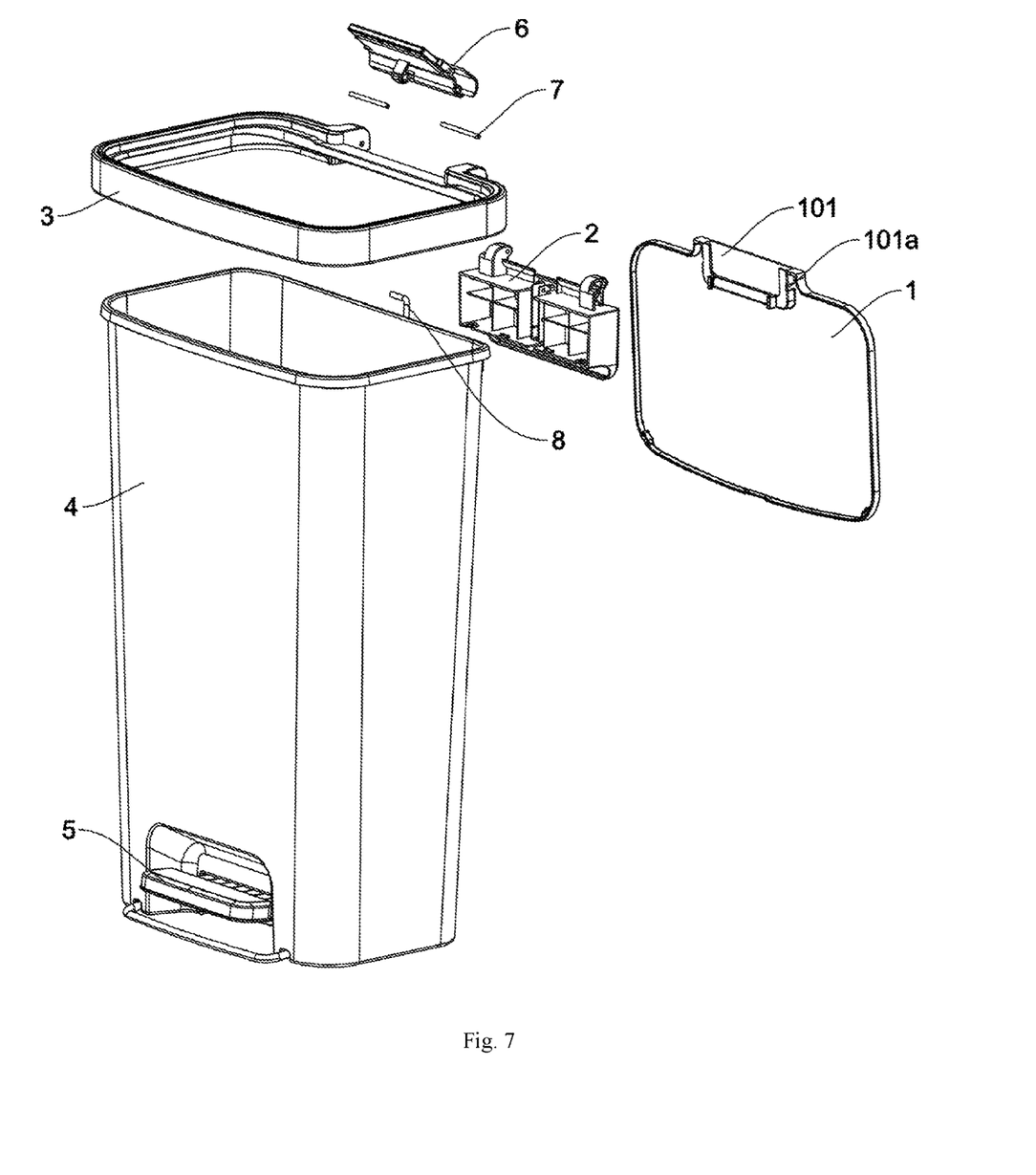
FIG. 7 is an exploded view of the trash can according to an embodiment of the present disclosure.
Figure 8:
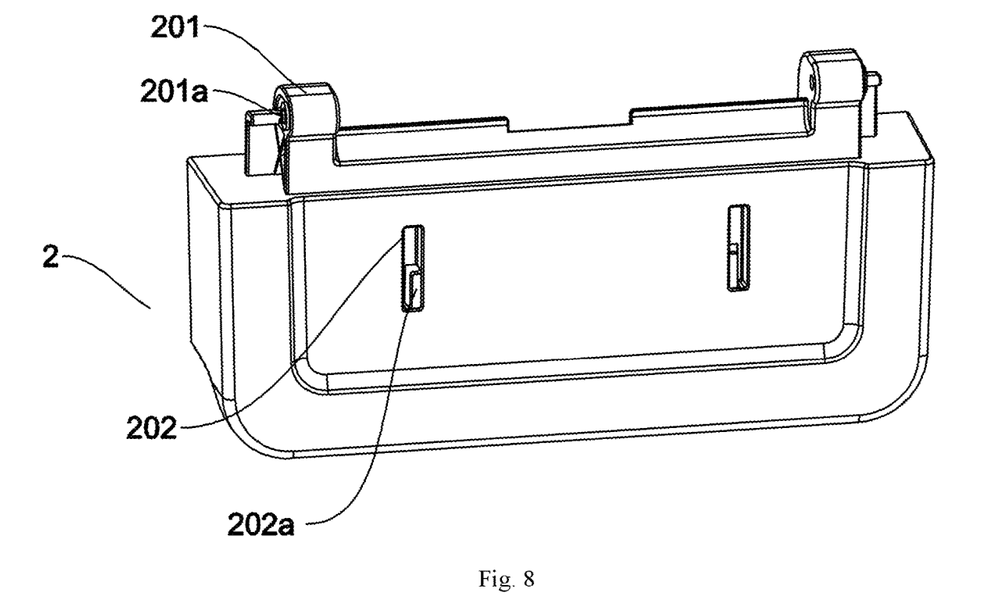
FIG. 8 is a first schematic diagram of a mounting base according to an embodiment of the present disclosure.
Figure 9:
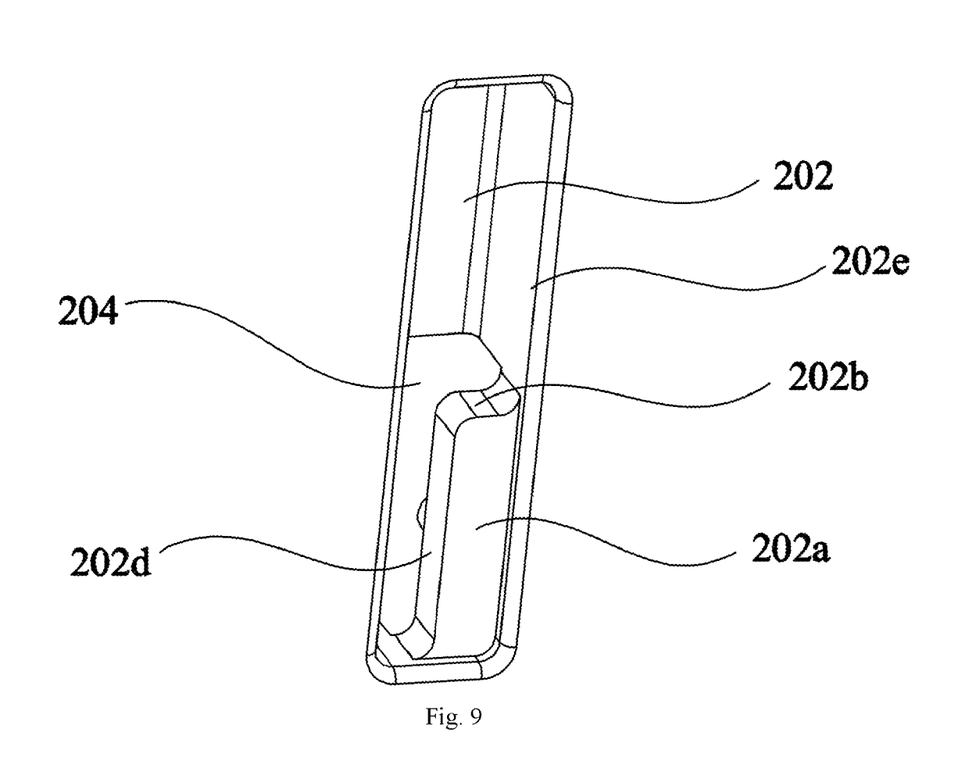
FIG. 9 is a schematic diagram of a hanging groove according to an embodiment of the present disclosure.
Figure 10:
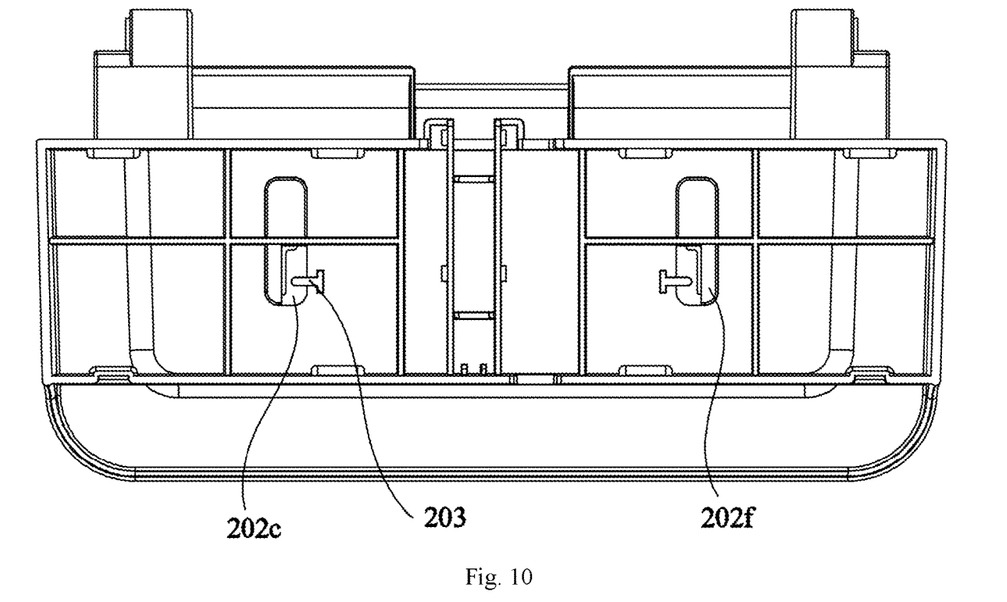
FIG. 10 is a second schematic diagram of the mounting base according to an embodiment of the present disclosure.
Figure 11:
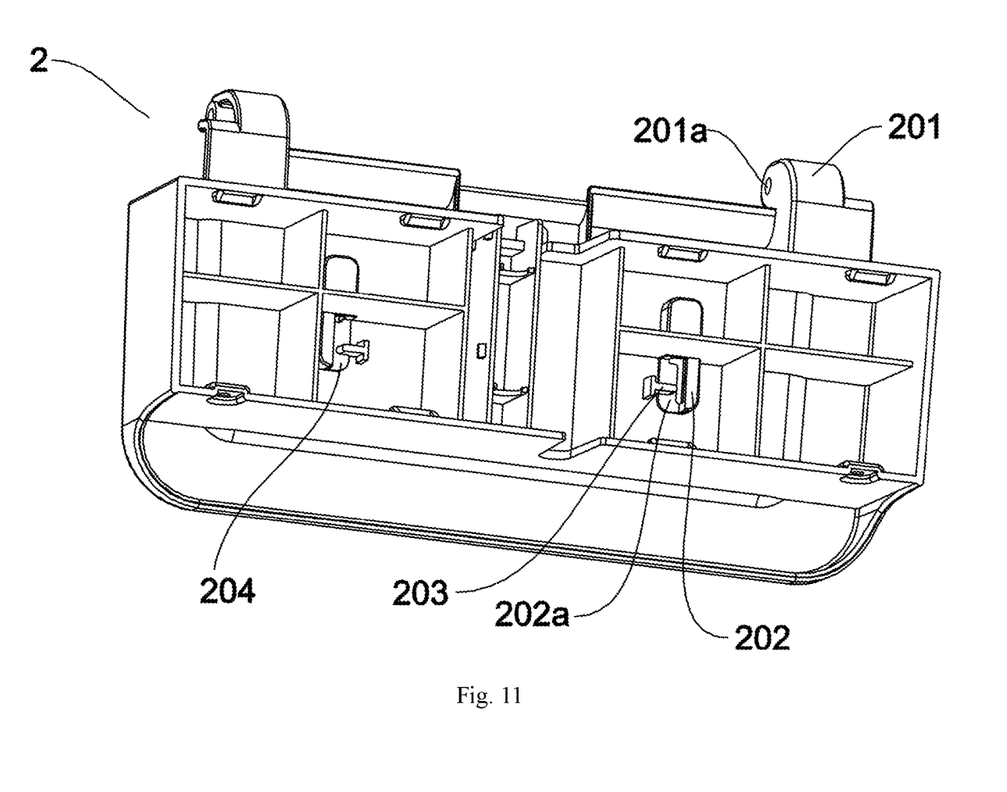
FIG. 11 is a third schematic diagram of the mounting base according to an embodiment of the present disclosure.
Figure 12:
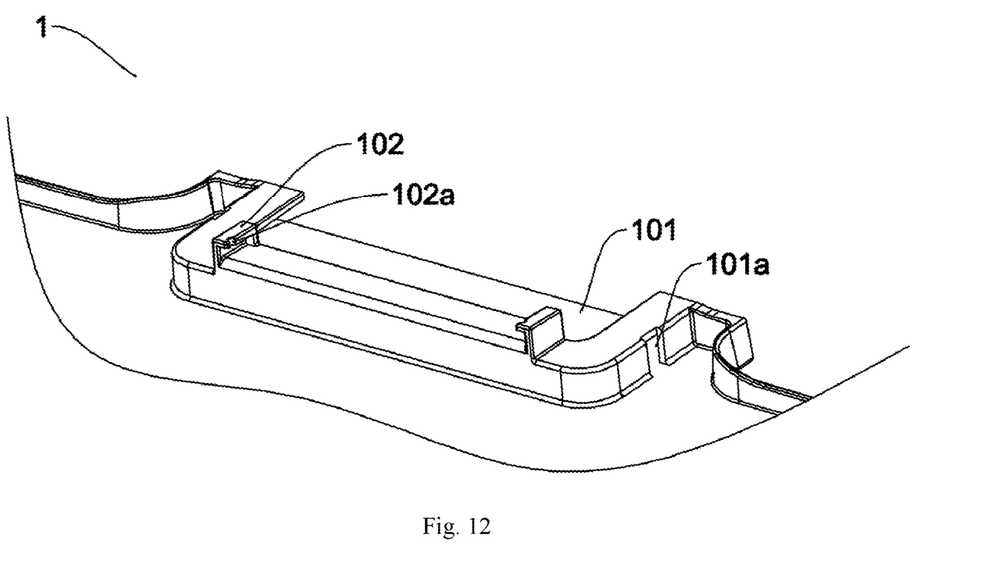
FIG. 12 is a first schematic diagram partially showing a structure of the lid according to an embodiment of the present disclosure.
Figure 13:
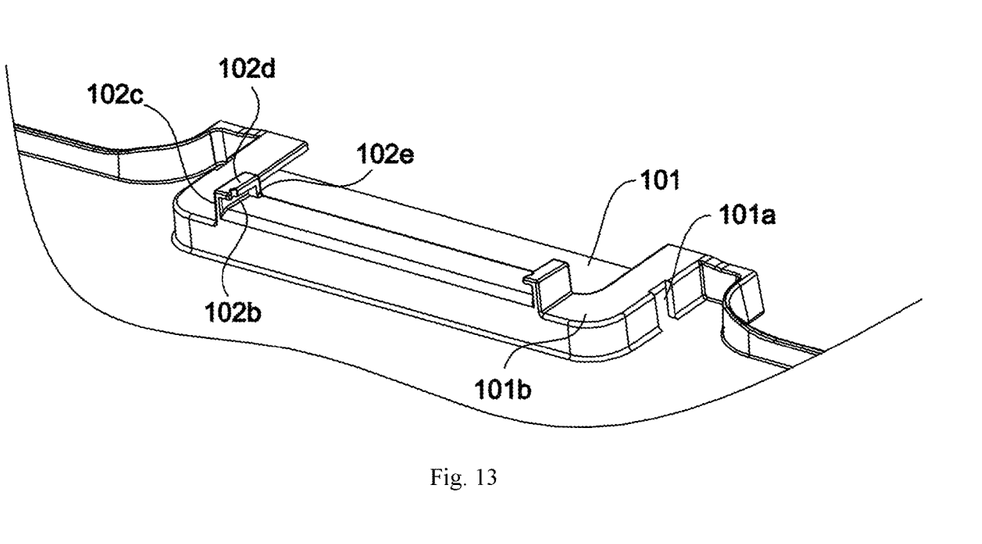
FIG. 13 is a second schematic diagram partially showing the structure of the lid according to an embodiment of the present disclosure.
Figure 14:
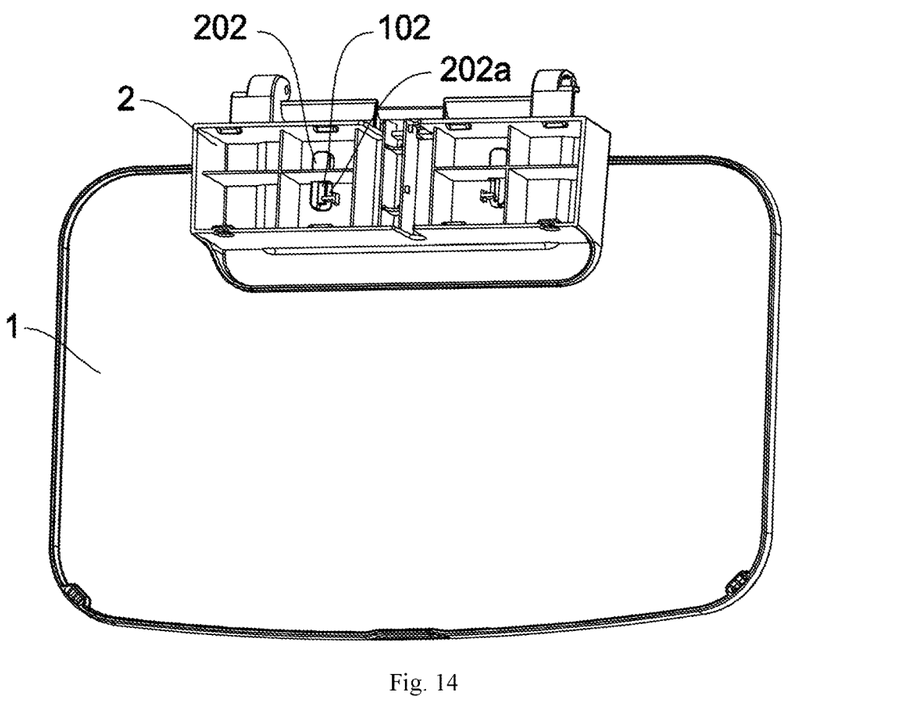
FIG. 14 is a schematic diagram of the mounting base and the lid according to an embodiment of the present disclosure.
Figure 15:
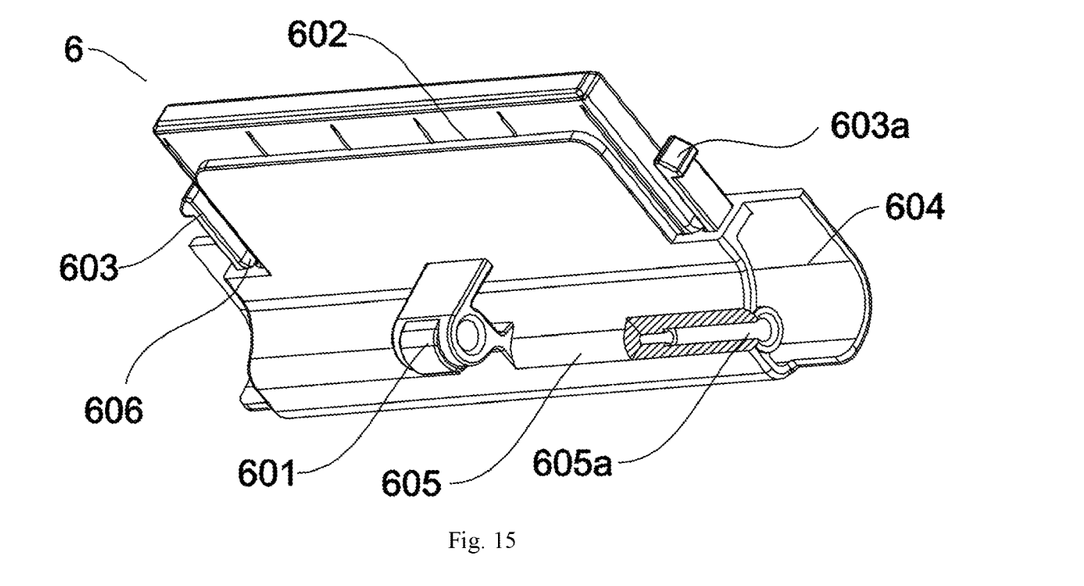
FIG. 15 is a schematic diagram of a connecting part according to an embodiment of the present disclosure.
Figure 16:
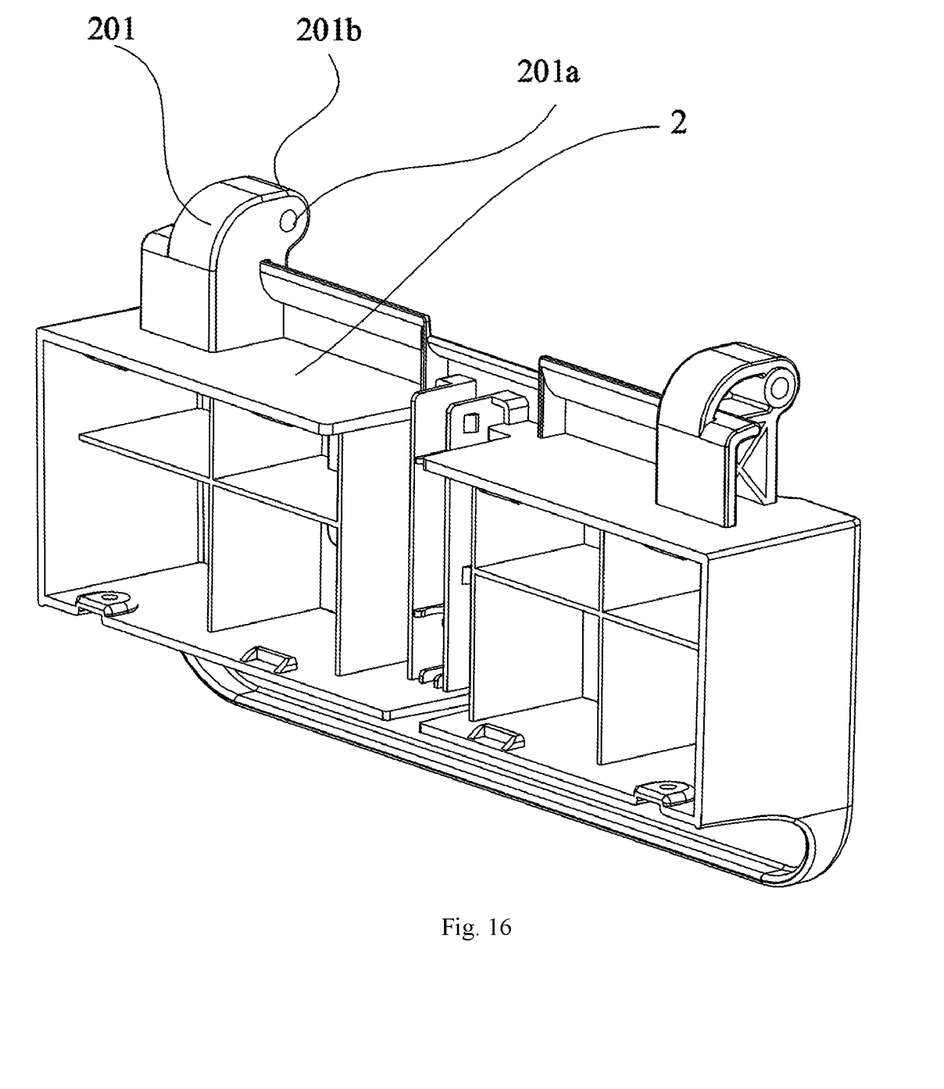
FIG. 16 is a fourth schematic diagram of the mounting base according to an embodiment of the present disclosure.

As shown in FIGS. 1-16, a fixing structure for lid assembly and disassembly of a trash can is provided. The trash can includes a decorative ring 3 and a lid 1, which are detachable from a trash can body 4.

The decorative ring 3 and at least one connecting part 6 are pre-arranged at an opening of the trash can body 4, where the connecting part 6 is rotatable relative to the trash can body 4. The arrangement of the decorative ring 3 and the connecting part 6 does not hinder the stacking of multiple trash can bodies 4.

The waste enters an interior of the trash can body 4 through an inner ring of the decorative ring 3.

The connecting part 6 is in clamping-connection with the lid 1. The lid 1 is stationary with respect to the connecting part 6 after being clamped with the connecting part 6. The lid 1 can be turned over with respect to the trash can body 4 and the decorative ring 3, and cover at least the inner ring of the decorative ring 3.

A hanging structure includes a hanging groove 202 and a hanging part 102. The hanging groove 202 is arranged on an outer wall of the trash can body 4. The hanging part 102 is arranged on the lid 1. The hanging part 102 is configured to be engaged with the hanging groove 202 to enable attachment of the lid to the trash can body 4 and is configured to be disengaged from the hanging groove 202 to enable detachment of the lid from the trash can body 4. During transportation or storage, the lid 1 is hung on a side of the trash can body 4 and does not hinder the stacking of multiple trash can bodies 4.

Firstly, the lid 1 is detachable from the trash can body 4, enabling the stacking of multiple trash can bodies 4 and a smaller transport volume, thereby reducing the transport costs.

Secondly, the hanging structure that does not hinder the stacking of multiple trash can bodies 4 is provided between the trash can body 4 and the lid 1, which eliminates the need for store staff to assemble the lid 1 with the trash can body 4 and allows the trash can to be sold in a "trash can body-lid" kit, avoiding problems that the lid is missed, or more lids are taken by mistake.

Moreover, as recorded in the background, the rotating connection structure between the trash can body 4 and the lid 1 is the main force structure, and thus requires a strong connection and structural strength. Unfortunately, such rotating connection structures are difficult to install. To solve this problem, in this embodiment, the rotatable connecting part 6 is pre-assembled at the opening of the trash can body by a professional manufacturer before delivery. The user only needs to install a simple snap-fit structure. Besides, as the manufacturers are more professional in assembly, the rotating connection structure can also be designed into a structure with higher structural strength and larger installation difficulty to reach the desired service life. While the snap-fit, which is not the main stress structure, can be designed with lower strength but simple assembly, improving user experience and reducing the return rate.

Finally, compared with the trash can without a decorative ring, the trash can provided with a decorative ring is more conspicuous and aesthetic, and can attract consumers' attention more easily, leading to an increase in sales.

Specifically, the decorative ring 3 can be fixedly arranged on the trash can body of the trash can, or can be rotatably connected to the trash can body of the trash can. The rotatable decorative ring 3 can be used to press the edge of the rubbish bag to avoid leakage of wastes from the edge of the rubbish bag.

Specifically, the size of the inner ring of the decorative ring 3 is equal to or slightly smaller than the size of the trash can body 4, and should not be too small to affect the stacking of the trash can body 4.

The fixing structure provided herein can be applied to any bin having a flip-up lid. Specifically, this embodiment takes a flip-up trash can provided with a pedal 5 as an example.

In this embodiment, the trash can also includes a pedal 5, which is provided at the bottom of the outer side wall of the trash can body 4. The pedal 5 is connected to the connecting part 6 via a support rod 8 and is configured to drive the lid 1 to flip over.

The connecting part 6 is provided with a connection seat 601, which is connected to the support rod 8. The support rod 8 is pre-installed together with the connecting part 6 such that the user does not need to install the support rod 8, further simplifying the installation steps for the user. It also illustrates that the fixing structure of the present disclosure can be applied to many different types of trash cans, all of which have simplified installation steps for the user.

In this embodiment, the trash can body 4 is provided with an inwardly recessed accommodating groove 401 above the pedal 5. The pedal 5 can be folded upwards into the accommodating groove 401. Hence, the pedal 5 and the support rod 8 can also pre-installed by the manufacturer, and the pedal 5 can be stored in the accommodating groove 401 to avoid affecting the stacking of multiple trash can bodies 4.

In this embodiment, a side of the trash can body 4 is provided with a mounting base 2 near the top, and the mounting base 2 and the trash can body 4 are integral or separated from each other. In this embodiment, the mounting base 2 is a square housing with an opening, and is arranged on the trash can body 4 with the opening being attached to the trash can body 4. The mounting base 2 can be used to mount functional parts such as buffers or to cover the structure around the opening of the trash can body. The mounting base 2 is protrusively arranged on the outer side wall of the trash can body 4. In this case, when the lid 1 is connected to the mounting base 2, there is an avoidance gap 9 between the lid 1 and the trash can body 4, and a width of the gap is larger than a wall thickness of the trash can body 4, thus enabling the stacking of multiple trash can bodies 4. The outer side wall of the mounting base 2 is provided with a hanging groove 202.

The lid 1 hung on the outer side wall of the mounting base 2 is not in contact with the side wall of the trash can body 4 to form an avoidance gap for the stacking of another trash can body 4.

In this embodiment, the mounting base 2 is provided with at least one hanging groove 202. To ensure the stability of the lid 1 during hanging, the mounting base 2 in this embodiment is symmetrically provided with two hanging grooves 202. The lid 1 is provided with a hanging part 102 that fits the hanging groove 202, and the hanging groove 202 and the hanging part 102 form a hanging structure.

The hanging structure has many conventional forms. In this embodiment, the hanging groove 202 is formed by the inward recession on the outer wall of the mounting base 2.

The hanging groove 202 is provided with a clamping portion 202a near the opening 202e. The clamping portion 202a is strip-shaped structure extending along the depth direction of the hanging groove 202. Atop end 202b of the clamping portion 202a is located at the middle of the hanging groove 202 in the length direction of the hanging groove 202. The clamping portion 202a partially covers the opening 202e, so as to reserve sufficient area at the opening 202e for the entry of the hanging part 102. The clamping portion 202a also includes a first side wall 202c and a second side wall 202d. The first side wall 202c is arranged towards the bottom 202f of the hanging groove 202. Any two of the top end 202b, the first side wall 202c and the second side wall 202d are perpendicular to each other. The first side wall 202c is positioned in the middle of the hanging groove 202 in the depth direction, so that the hanging part 102 can be moved back and forth in the hanging groove 202 in the length direction of the clamping portion 202a.

The hanging part 102 includes a first side surface 102c, a second side surface 102d and a third side surface 102e. The first side surface 102c is arranged vertically on the top surface 101b of the insertion groove 101. The second side surface 102d is perpendicular to the first side surface 102c, and is parallel to the top surface 101b of the insertion groove 101. The third side surface 102e is arranged vertically on the top surface 101b of the insertion groove 101. The third side surface 102e is perpendicular to the first side surface 102c and the second side surface 102d, respectively. The first side surface 102c, the second side surface 102d and the third side surface 102e together form the clamping cavity 102b. The clamping cavity 102b is configured to accommodate the clamping portion 202a. The third side surface 102e is configured to abut against the top end 202b of the clamping portion 202a to enable the clamping portion 202a to be clamped in the clamping cavity 102b of the hanging part 102, thereby fixing the clamping portion 202a in the width direction of the hanging part 102. In this way, the lid 1 can be hung on the trash can body 4, and is not easily detached from the trash can body 4.

In this embodiment, the hanging structure further include a first tab 203. The first tab 203 is protrusively arranged on the first side wall 202c of the clamping portion 202a. The clamping groove 102a is provided at the side of the second side surface 102d of the hanging part 102 away from the first side surface 102c. The clamping groove 102a is semi-circular. The first tab 203 is configured for clamping in the clamping groove 102a to achieve fixation of the clamping portion 202a in the length direction of the hanging part 102. The clamping portion 202a fits with the clamping cavity 102b, and the first tab 203 fits with the clamping groove 102a. In this way, the hanging part 102 can be fixed relative to the hanging groove 202. The second side wall 202d is positioned in the middle of the hanging groove 202 in the width direction to enable the hanging part 102 to move back and forth in the hanging groove 202 along the width direction of the clamping portion 202a.

The hanging part 102 enters the hanging groove 202 through the opening 202e located above the top end 202b of the clamping portion 202a. The bottom 202f of the hanging groove 202 is configured to prevent the hanging part 102 from moving deeper to indicate that the movement of the hanging part 102 in the depth direction of the hanging groove 202 is in place. Then the hanging part 102 moves downwards. The bottom end of the clamping cavity 102b enters the clamping part from the top end 202b until the second side surface 102d of the clamping cavity 102b abuts against the first tab 203. After that, the hanging part 102 moves away from the clamping portion 202a along the width direction of the clamping portion 202a until the second side surface 102d of the clamping cavity 102b is out of contact with the first tab 203. The hanging part 102 continues to move downwards. When the clamping groove 102a moves to the position of the first tab 203, the hanging part moves 102 towards the clamping portion 202a in the width direction of the clamping portion 202a, so that the first tab 203 is clamped in the clamping groove 102a, that is, the hanging part 102 is fix in the hanging groove 202.

Specifically, the bottom 202f of the hanging groove 202 is provided with a notch 204, and the first tab 203 is partially located in the notch 204. One end of the first tab 203 protrudes from the first side wall 202c of the clamping portion 202a, and has a semi-circular cross section. The other end of the first tab 203 extends outwards to the bottom wall of the mounting base 2 to form a reinforcement structure, thereby enhancing the structural strength of the clamping portion 202a.

In this embodiment, the trash can further includes at least one rotating connection shaft 7. The top end 202b of the mounting base 2 is provided with a first shaft-hole base 201. The first shaft-hole base 201 is provided with a first shaft hole 201a. The connecting part 6 is provided with a second shaft hole 605a.

The rotating connection shaft 7 is inserted in both the first shaft hole 201a and the second shaft hole 605a, thus forming an articulated connection between the connecting part 6 and the body 4.

In this embodiment, the decorative ring 3 can also be rotatably pre-installed in the first shaft-hole base 201. The decorative ring 3 is coaxially hinged with the connecting part 6.

Specifically, considering that the design of one rotating connection shaft 7 will make the insertion stroke long and the alignment assembly inconvenient, two rotating connection shafts 7 are provided in this embodiment. One of the two rotating connection shafts 7 is inserted into the first shaft hole 201a along a first direction, and the other of the two rotating connection shafts 7 is inserted into the second shaft hole 605a along a second direction, where the first direction is opposite to the second direction.

In this embodiment, the connecting part 6 is provided with a rotatable connection shaft cylinder 605. Two sides of an inner barrel of the rotatable connection shaft cylinder 605 are each provided with a two-step shaft hole, and the two two-step shaft holes are symmetrically provided. An outer shaft hole of each two-step shaft hole is the second shaft hole 605a, and the diameter of an inner shaft hole of each two-step shaft hole is smaller than the diameter of the rotating connection shaft 7 to limit the insertion of the rotating connection shaft 7, which is used to indicate that the rotating shaft 7 is in place during assembly.

Two shaft-hole bases 201 are symmetrically provided on the top of the mounting base 2, one of which is located on one side of the rotatable connection shaft cylinder 605, the other of which is located on the other side of the rotatable connection shaft cylinder 605. The connecting part 6 is provided with a butting portion 604 on the left and right outer side of the rotatable connection shaft cylinder 605. The butting portion 604 abuts against a protrusion 201b of the first shaft-hole base 201 after the lid 1 is turned over at a certain angle. The protrusion 201b is arranged back towards the trash can body. The first shaft-hole 201a is provided at the middle of the protrusion 201b to limit the flip of the lid 1, so as to prevent the lid 1 from being overturned.

In this embodiment, the lid 1 is provided with an insertion groove 101. The insertion groove 101 is provided on the top of the rotatable connection shaft cylinder 605. The connecting part 6 is provided with an inserting block 602 fitting with the insertion groove 101. The insertion groove 101 and the inserting block 602 form a clamping structure. The inserting block 602 is inserted in the insertion groove 101 to assemble the lid 1 with the connecting part 6.

The inserting block 602 and the insertion groove 101 can be clamped through many conventional structures. In this embodiment, both sides of the insertion groove 101 are provided with a gap 101a running through the side wall of the insertion groove 101. The cross-sectional shape of the gap 101a is rectangular. Two sides of the inserting block 602 are provided with second tabs 603 fitting with the gap 101a, and the second tabs are spaced apart. A hook portion 603a of the second tab faces outwards. The second tab 603 is gaped with a side of the inserting block 602 with a distance larger than the width of the hook portion 603a. The second tab 603 is elastic. When pushing the lid 1 towards the connecting part 6, the second tab 603 and the inserting block 602 enter the insertion groove 101 together. Due to the elasticity of the second tabs 603, the second tabs 603 can be squeezed to move towards the inserting block 602, so that the second tabs 603 suffer elastic deformation to approach to each other. The hook portion of the second tab 603 snaps into the gap 101a, thus achieving a clamping connection between the connecting part 6 and the lid 1. This structure can facilitate the installation of the lid 1. The gap 101a runs through the side wall of the insertion groove 101 such that the user can stop applying force after observing the hook portion 603a being snapped into the gap 101a when assembling the lid 1, thereby avoiding excessive force and structural damage.

Specifically, the hook portion 603a is a convex with a triangular cross-section. The bottom end of the hook portion 603a is protruding, and is configured to abut against the gap 101a.

Following the teaching of the present disclosure, the above-mentioned embodiments can also be changed and modified by one of ordinary skill in the art. Therefore, the present disclosure is not limited to the embodiments disclosed and described above, and those modifications and changes made without departing from the spirit and scope of the disclosure should also fall within the scope of the present disclosure defined by the claims. Furthermore, those specific terms used herein are merely used for simplify the description, and do not constitute any limitation to the present disclosure.

What is claimed is:

1. A fixing structure for lid assembly and disassembly of a trash can, the trash can comprising a trash can body, a lid and a connecting part; the trash can body and the lid being arranged separately; the connecting part being arranged at an opening of the trash can body; the connecting part being in snap-fit connection with the lid; the connecting part being able to flip relative to the trash can body, so as to drive the lid in snap-fit connection with the connecting part to flip; and the fixing structure comprising:
    a hanging structure;
    wherein the hanging structure comprises a hanging groove, a hanging part and a clamping portion; the hanging groove is provided on an outer side wall of the trash can body; the hanging part is provided on the lid; the hanging part is configured to be engaged with the hanging groove to enable attachment of the lid to the trash can body, and is configured to be disengaged from the hanging groove to enable detachment of the lid from the trash can body; and when the lid is disengaged from the connecting part, the hanging part is engaged with the hanging groove, such that the lid is hung on a side of the trash can body; and the clamping portion is configured to extend along a depth direction of the hanging groove.

2. The fixing structure of claim 1, wherein the trash can comprises a mounting base; the mounting base is protrusively arranged on the outer side wall of the trash can body at the opening; the connecting part is arranged on the mounting base; the hanging groove is provided on an outer side wall of the mounting base; and when the lid is attached to the mounting base, an avoidance gap is provided between the lid and the trash can body, and a width of the avoidance gap is larger than a wall thickness of the trash can body.

3. The fixing structure of claim 2, wherein the clamping portion is arranged inside the hanging groove; the clamping portion comprises a top end; the top end is located at a middle of the hanging groove in a length direction of the hanging groove; the hanging part comprises a first side surface, a second side surface, and a third side surface; the first side surface is perpendicular to the lid; the second side surface is perpendicular to the first side surface, and is parallel to the lid; the third side surface is perpendicular to the lid, the first side surface and the second side surface; the first side surface, the second side surface and the third side surface together form a clamping cavity; the clamping cavity is configured to accommodate the clamping portion; the third side surface is configured to abut against the top end of the clamping portion to enable the clamping portion to be clamped in the clamping cavity.

4. The fixing structure of claim 3, wherein the clamping portion further comprises a first side wall and a second side wall; the first side wall is arranged towards a bottom of the hanging groove; any two of the top end, the first side wall and the second side wall are perpendicular to each other; the first side wall is located at a middle of the hanging groove in the depth direction of the hanging groove; the second side wall is located at a middle of the hanging groove in a width direction of the hanging groove; the hanging structure further comprises a tab; the tab is protrusively arranged on the first side wall; a side of the second side surface away from the first side surface is provided with a clamping groove; and the tab is configured to be clamped in the clamping groove to fix the hanging part relative to the hanging groove.

5. The fixing structure of claim 4, wherein the bottom of the hanging groove is provided with a notch, and the tab is partially located in the notch; and one end of the tab protrudes from the first side wall of the clamping portion, and the other end of the tab is provided on a bottom wall of the mounting base to form a reinforcement structure.

6. The fixing structure of claim 2, wherein the trash can further comprises at least one rotating connection shaft; a top end of the mounting base is provided with a shaft-hole base; the shaft-hole base is provided with a first shaft hole; the connecting part is provided with a second shaft hole; and the at least one rotating connection shaft is configured to be inserted into the first shaft hole and the second shaft hole to enable hinged connection between the connecting part and the trash can body.

7. The fixing structure of claim 6, wherein the trash can further comprises a decorative ring; the decorative ring is provided at the opening of the trash can body; the decorative ring is configured to allow trash to enter the trash can body; and the lid is configured to cover an inner ring of the decorative ring.

8. The fixing structure of claim 7, wherein the decorative ring is coaxially connected to the shaft-hole base; and the decorative ring is able to pivot relative to the shaft-hole base.

9. The fixing structure of claim 1, wherein the lid is provided with an insertion groove; the connecting part comprises an inserting block and a rotatable connection shaft cylinder; the inserting block is arranged on a top end of the rotatable connection shaft cylinder; the rotatable connection shaft cylinder is in coaxial connection with the trash can body to enable the connecting part to flip relative to the trash can body; the inserting block is configured to be inserted into the insertion groove to achieve snap-fit connection between the connecting part and the lid.

10. The fixing structure of claim 9, wherein the connecting part comprises two tabs; the two tabs are provided on the top end of the rotatable connection shaft cylinder; one of the two tabs is provided at one side of the inserting block, and the other of the two tabs is provided at the other side of the inserting block; a clearance is provided between each of the two tabs and the inserting block; the two tabs are elastic; two side walls of the insertion groove are each provided with a gap; and the two tabs are configured to be respectively clamped in gaps of the side walls of the insertion groove to fix the inserting block in the insertion groove.

11. The fixing structure of claim 10, wherein the connecting part further comprises a connection seat; one end of the connection seat is connected to the rotatable connection shaft cylinder, and the other end of the connection seat is connected to the inserting block; the trash can further comprises a pedal and a support rod; the pedal is provided at a bottom end of the outer side wall of the trash can body; one end of the support end is connected to the pedal, and the other end of the pedal is connected to the connection seat, so as to drive the lid to flip.

12. The fixing structure of claim 11, wherein the outer side wall of the trash can body is provided with an accommodating groove; the pedal is arranged in the accommodating groove; and the pedal is capable of flipping relative to the trash can body to enable the pedal to be stored in the accommodating groove.

* * * * *